United States Patent [19]

Tsygankov et al.

[11] 4,142,027
[45] Feb. 27, 1979

[54] ALKALINE NICKEL-CADMIUM STORAGE BATTERY

[76] Inventors: Mikhail S. Tsygankov, ulitsa Ordzhonikidze, 14, kv. 24; Valery N. Kosholkin, Novo-Astrakhanskoe shosse, 43, kv. 47; Nina A. Bitjutskaya, ulitsa Stepana Razine, 36, kv. 18; Oleg G. Malandin, ulitsa Sovetskaya, 23, kv. 23, all of Saratov, U.S.S.R.

[21] Appl. No.: 717,479

[22] Filed: Aug. 25, 1976

Related U.S. Application Data

[63] Continuation of Ser. No. 482,597, Jun. 24, 1974.

[30] Foreign Application Priority Data

Jun. 22, 1973 [SU] U.S.S.R. .............................. 1933895

[51] Int. Cl.² .......................................... H01M 10/30
[52] U.S. Cl. .................................. 429/159; 429/163; 429/222; 429/223
[58] Field of Search ................. 429/60, 156, 158, 159, 429/160, 163, 206, 222, 223, 235, 217

[56] References Cited

U.S. PATENT DOCUMENTS

| 2,024,637 | 12/1935 | Geyer | 429/156 |
| 2,642,469 | 6/1953 | Gary, Jr. | 429/223 X |
| 2,699,458 | 1/1955 | Schlecht et al. | 429/222 |
| 2,738,375 | 3/1956 | Schlotter | 429/217 |
| 3,877,986 | 4/1975 | Catherino | 429/217 |

FOREIGN PATENT DOCUMENTS

| 792464 | 3/1958 | United Kingdom | 429/222 |
| 1084962 | 9/1967 | United Kingdom | 429/222 |

Primary Examiner—Anthony Skapars
Attorney, Agent, or Firm—J. Harold Nissen

[57] ABSTRACT

An alkaline nickel-cadmium storage battery whose container accommodates cells connected in-series by intercell connectors, the jars of said cells containing positive cerametallic plates in combination with pasted cadmium-oxide negative plates with separators in between; said plates are combined into groups with the aid of terminal posts.

6 Claims, 5 Drawing Figures

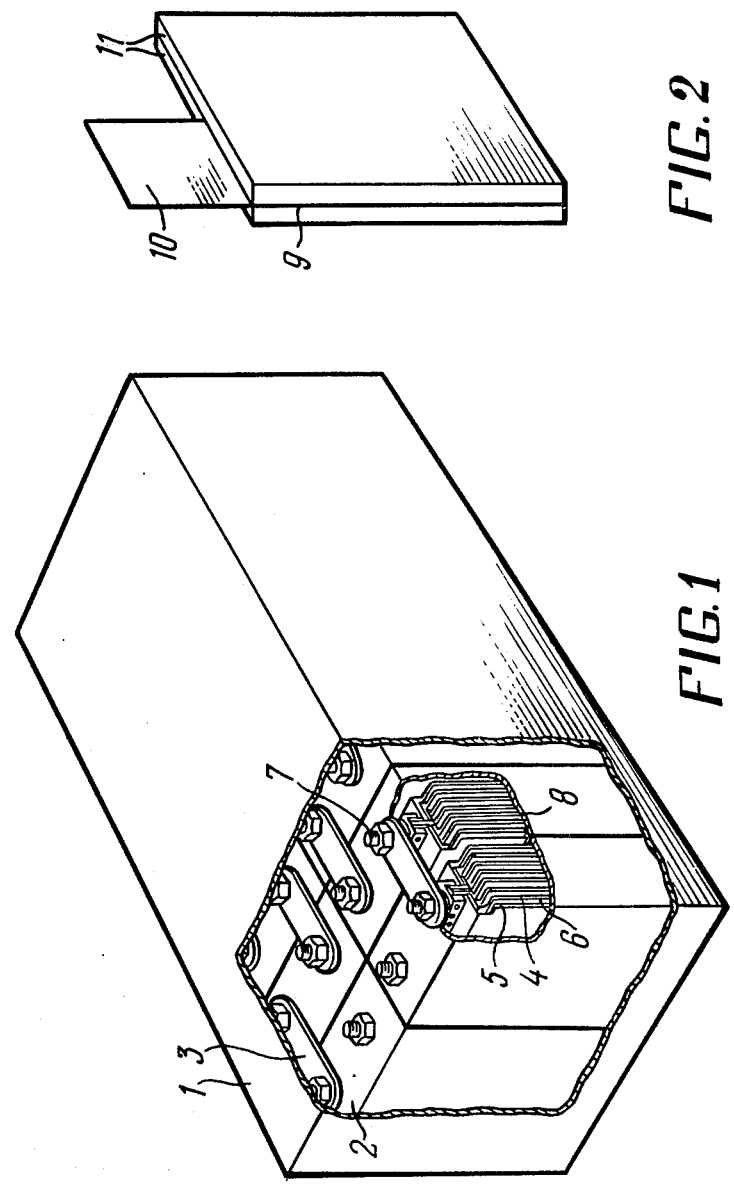

ALKALINE NICKEL-CADMIUM STORAGE BATTERY

This is a continuation of U.S. patent application Ser. No. 482,597, filed June 24, 1974.

The present invention relates to alkaline nickel-cadmium storage batteries and is intended for use in transport facilities as a standby source of electrical energy and for the non-assisted starting of engines.

For example, the alkaline nickel-cadmium storage battery according to the invention can be used in aircraft e.g., airplanes and helicopters.

In devising a standby source of electrical energy for aviation the major factors under consideration are processability, ability to function within a wide range of temperatures, provision of maximum specific characteristics ensuring reliable nonassisted starting of engines and reliable operation of all airborne electrical loads, combined with a minimum weight and small dimensions.

The above requirements are satisfied most fully by nickel-cadmium storage batteries which are in widespread use in aircraft equipment, e.g. nickel-cadmium storage batteries with positive and negative plates made of a cerametallic material.

In the known nickel-cadmium storage batteries the base of the positive and negative plates is constituted by baked porous nickel sponge applied to a metal backing. In making positive plates the porous nickel sponge is soaked in nickel salt solutions while in the case of negative plates cadmium salt solutions are used.

However, the design and technological characteristics of said nickel-cadmium storage batteries have a number of disadvantages which worsen considerably their specific and operational properties.

The main disadvantage lies in the use of a cerametallic negative plate wherein the major portion of its weight and volume is taken by the baked nickel sponge which takes no part in electrochemical reactions and is, in fact, a ballast in the negative plate.

The weight of the baked nickel sponge reaches 40% of the weight of negative plates while its volume is 50% which, eventually, increases the weight and volume of the alkaline nickel-cadmium storage battery. The presence of nickel sponge in the negative plate increases its dimensions, thereby limiting the total number of plates in the cells; this prevents maximum development of the working surface of the plate groups which is indispensable for operation within wide temperature limits at heavy discharge duties during non-assisted starting of engines.

Besides, the use of baked nickel sponge in negative plates involves extensive expenditure of the not easily available nickel powder, additional operations related to its application, baking and impregnating with active cadmium salts. This brings about extra expenditures of material and labor which raise the cost of alkaline nickel-cadmium batteries.

An object of the present invention resides in eliminating the aforesaid disadvantages.

The main object of the invention resides in providing an alkaline nickel-cadmium storage battery with high specific characteristics, capable of functioning within a wide range of temperatures, featuring good starting properties for non-assisted starting of engines, which would be easy to manufacture and require a smaller amount of scarce materials.

This object is accomplished by providing an alkaline nickelcadmium storage battery comprising a container which accommodates cells connected in-series by intercell connectors and positive and negative plates with separators inbetween, said plates being assembled with the aid of terminal posts into groups and placed into jars wherein, according to the invention, the cells consist of positive cerametallic plates in combination with pasted cadmium oxide negative plates.

It is practicable that maximum specific characteristics of an alkaline nickel-cadmium storage battery should be obtained by selecting the ratio of the thickness of negative plates to that of the positive plates within 0.45–0.60.

The alkaline nickel-cadmium storage battery according to the invention which consists of cerametallic positive plates and pasted cadmium oxide negative plates makes it possible to increase the specific characteristics of the battery by 15–20%, reduce the weight and size of the battery correspondingly, increase considerably the active surface of the plate groups, improve the starting performance of the batteries during non-assisted starting of engines and to widen the temperature range of operation towards the side of negative temperatures.

Exclusion of baked nickel sponge from the negative plates reduces the requirement for the scarce nickel powder by 35–45% and facilitates manufacture of the negative plates. This disposes of such operations as application of nickel powder to a metal backing, baking of the nickel sponge and impregnating it with active cadmium salts.

The pasted cadmium oxide negative plates used in the alkalined nickel-cadmium storage battery according to the invention can be very thin without any detriment to their electrical characteristics. The manufacture of the pasted cadmium oxide negative plate lends itself easily to mechanization and automation, thus bringing down the amount of required labor.

Now the invention will be described in detail by way of example with reference to the accompanying drawings, in which:

FIG. 1 shows an alkaline nickel-cadm storage battery;

FIG. 2 shows positive and negative plates of the battery according to the invention;

Figure 3:
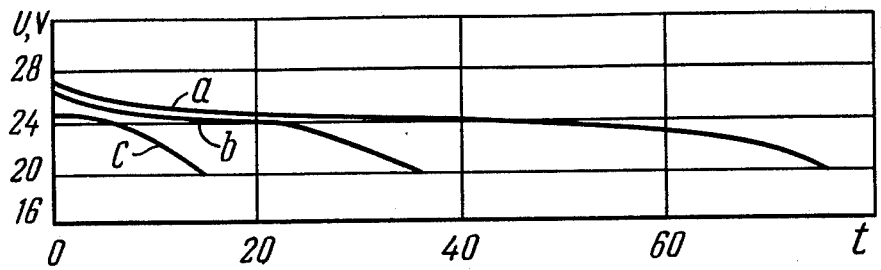
FIG. 3 illustrates the discharge curves of the battery according to the invention at various current ratings.

The alkaline nickel-cadmium storage battery (FIG. 1) comprises a container 1, e.g. a metal one, which accommodates cells 2 connected in-series by intercell connectors 3. Each cell consists of positive cerametallic plates 4 separated from pasted negative cadmium-oxide plates 5 by separators 6.

The positive cerametallic plates 4, negative pasted plates 5 and separators 6 are assembled with the aid of terminal posts into plate groups which aree placed into jars 8, e.g. plastic ones.

Both positive and negative plates 4 and 5 (FIG. 2) in the cells consist of a metal bracking 9 with a current collector tongue 10 which is used to combine separate plates into groups with the aid of terminal posts 7 (FIG. 1). The metal backing 9 of the positive cerametallic electrodes 4 is coated with a nickel powder suspension which is subsequently baked in hydrogen at 800°–1100° C. to form a baked nickel sponge 11. Then said sponge 11 is soaked with active nickel salts, e.g. nickel nitrates, so that the sponge pores are filled with nickel hydroprotoxide which is the active material of the positive plate. The manufacture of the positive cerametallic plates 4 is mechanized so that making of the metallic backing, coating it with nickel powder suspension, baking, impregnation with active nickel salts and forming takes the form of a continuous strip from which the finished battery plates are punched.

In manufacturing the pasted negative plate 5 (FIG. 1), the metal backing 9 (FIG. 2) is coated with a paste consisting of cadmium oxide and an organic binder. The negative pasted plates are manufactured in the form of continuous strips which are coated with paste, dried, and cut into finished plates.

The manufacture of pasted negative plates 5 from cadmium oxide simplifies considerably and cheapens the alkaline nickel-cadmium storage batteries as compared with those made with cerametallic neative plates by disposing of a number of technological operations such as application of nickel powder suspension, baking and impregnating with active cadmium salts and by reducing the consumption of the scarce nickel powder which, in fact, plays the role of ballast in he negative plate.

Besides, making the negative cadmium oxide electrodes by pasting allows the plates to be of any thickness, particularly thin ones, which is most vital for obtaining a maximum developed surface of plates in the cells and for ensuring high specific characteristics of storage batteries.

However, the known methods of manufacturing cerametallic negative plates are not suitable for making thin plates (thinner than 0.9 mm) with high specific characteristics.

A comparison of negative cadmium oxide pasted plates with the cerametallic negative plates of the same dimensions and capacity reveals that exclusion of the baked nickel sponge in the pasted cadmium oxide electrode reduces its thickness by 50% and its weight by 40-50% as compared with those of the cerametallic negative plate.

It should be noted that the advantage of the pasted cadmium oxide negative electrode become still greater with the reduction of the thickness.

A combination of the positive cerametallic electrodes 4 with the pasted cadmium oxide negative plates 5 improves the specific characteristics of alkaline storage batteries. In the first place, it is due to the fact that the group of pasted cadmium oxide negative plates is 40-50% lighter than the group of cerametallic negative plates of the same capacity which gives a 15-25% gain in weight per battery. Secondly, a maximum development of the active surface of the plate groups improves the starting properties and general serviceability of alkaline nickel-cadmium storage batteries at low temperature. The maximum increase in the area of the plate groups is achieved by the provision of an additional number of positive and negative plates in the battery cell by reducing the thickness of the pasted cadmium oxide negative plates. Besides, the possibility of making thin pasted cadmium oxide negative plates without affecting adversely their specific characteristics makes it possible to reduce also the thickness of the positive cerametallic plates thus increasing the active surface of the plate groups still further. If optimum specific characteristics of alkaline nickel-cadmium storage batteries are to be obtained, it is necessary to ensure a certain ratio between the capacities of the negative and positive plates in the cell, this ratio for many types of batteries amounting to 1.2-1.0.

The above ratio of capacities in the combination of cerametallic positive plates with pasted cadmium oxide negative plates is achieved when the relation of their thicknesses is within 0.45 and 0.60.

The chart (FIG. 3) shows the voltage vs. time curves of the alkaline nickel-cadmium storage battery according to the invention when said battery is discharged by various currents:curve a — 25 A; curve b — 50 A; curve c — 100 A.

The capacity delivered by the battery varies but slightly within the discharge current interval up to 100 A which testifies to its high starting characteristics.

Figure 4:
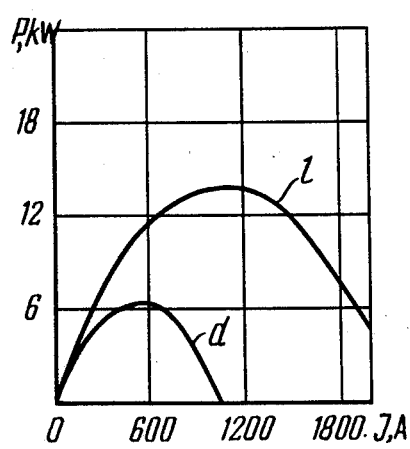
FIG. 4 illustrates comparative instantaneous power curves of alkaline nickel-cadminum storage batteries.

Shown in the chart in FIG. 4 are the maximum power vs. discharge curves for the alkaline nickel-cadmium storage battery and for the "Saft" battery (France), both having the same nominal capacity of 25 A-hr.

It can be seen from the chart that the maximum power of the "Saft" battery is 6.6 kW (curve d) at 600 A discharge current.

The maximum power of the alkaline nickel-cadmium storage battery according to the invention is 14 kW (curve e) at 1100 A discharge current which means that the power of the battery according to the invention is 2.2 times higher.

Figure 5:
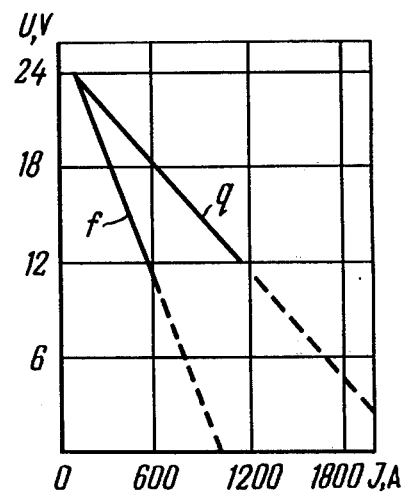
FIG. 5 illustrates comparative volt-ampere characteristics of alkaline nickel-cadmium storage batteries.

Shown in FIG. 5 are the comparative volt-ampere characteristics of the battery according to the invention and the "Shaft" battery, Type 2500.

It can be seen from the chart that the battery according to the invention (curve f) has considerably higher volt-ampere characteristics than the "Shaft" battery (curve g). A storage battery according to the invention has been realized in practice and its specific characteristics compared with the known analog are given in Table 1.

Table 1
Comparative characteristics of aircraft batteries

| No. | Characteristics | Alkaline nickel-cadmium storage battery according to the invention | "Saft" battery: Type 2500 |
|---|---|---|---|
| 1. | Volume, dm³ | 11.5 | 14.2 |
| 2. | Mass, kg | 24.0 | 26.5 |
| 3. | Nominal voltage, V | 24 | 24 |
| 4. | Nominal capacity, A-hr | 25 | 25 |
| 5 | Actual capacity at an hourly discharge, A-hr | 28 | 25 |
| 6. | Maximum discharge current, A | 800 | 600 |
| 7. | Service life (cycle) | 250 | — |
| 8. | Specific characteristics: | | |
|  | (a) capacity A-hr/kg | 1.25 | 110 |
|  | (b) energy W-hr/kg | 30.0 | 26.4 |
|  | (c) maximum power W-hr/kg | 570 | 225 |

We claim:

1. An alkaline nickel-cadmium storage battery suitable for usage in locations requiring reduced weight and increased activity per unit weight of the active surface areas particularly for use in transport facilities as a standby source of electrical energy, comprising:
a container;
cells located in said container, each said cell including:
a jar,
positive cerametallic plates,
pasted thin negative cadmium-oxide plates free of baked nickel sponge, said negative plates being less than 0.9 millimeters in thickness, the ratio of the thickness of said negative plates to the thickness of said positive plates being in the range of 0.45 to 0.60, separators between said positive and negative plates positioned in said jar, terminal posts for said positive and said negative plates for assembling thereof into groups; and intercell connectors coupled with said terminal posts connecting said cells in series.

2. The battery as set forth in claim 1, wherein:

said positive plates include a metal backing formed from a nickel powder suspension baked in hydrogen at 800°–1100° C. to form a baked nickel sponge, after which said baked nickel sponge is soaked with active nickel salts to fill the sponge pores with nickel hydroprotoxide thereby forming the active material of said positive plates, and said negative plates consist of cadmium oxide and an organic binder and have an operating capacity at least equal to the capacity of the positive plates.

3. The battery as set forth in claim 1, wherein:

said positive plates include a metal backing formed from a nickel powder suspension baked in hydrogen at 800°–1100° C. to form a baked nickel sponge, and said negative plates include a metal backing coated with a coating consisting of cadmium oxide and an organic binder.

4. The battery as set forth in claim 1, wherein:

said negative plates include a metal backing coated with a coating consisting of cadmium oxide and an organic binder.

5. The battery as set forth in claim 4, wherein:

said container is formed of a metal, said jar is formed of plastic,

6. The battery as set forth in claim 1, wherein:

said container is formed of a metal, said jar is formed of plastic, said positive plates include a metal backing formed from a nickel powder suspension baked in hydrogen at 800°–1100° C. to form a baked nickel sponge after which said baked nickel sponge is soaked with active nickel salts to fill the sponge pores with nickel hydroprotoxide thereby forming the active material of said positive plates, and said negative plates include a metal backing coated with a paste consisting of cadmium oxide and an organic binder and having an operating capacity at least equal to the capacity of the positive plates.

* * * * *